T. J. MAYALL.
HOSE OR TUBING.

No. 39,237.      Patented July 14, 1863.

Witnesses
Joseph Gavett
Albert W. Brown

Inventor
Th. J. Mayall

UNITED STATES PATENT OFFICE.

THOMAS J. MAYALL, OF ROXBURY, MASSACHUSETTS.

IMPROVED HOSE OR TUBING.

Specification forming part of Letters Patent No. 39,237, dated July 14, 1863.

*To all whom it may concern:*

Be it known that I, THOMAS J. MAYALL, of Roxbury, in the county of Norfolk and State of Massachusetts, have invented certain new and useful Improvements in the Manufacture of Hose or Tubing for Conveying Liquids; and I do hereby declare that the following description, taken in connection with the accompanying drawings, hereinafter referred to, forms a full and exact specification of the same, wherein I have set forth the nature and principles of my said improvements, whereby my invention may be distinguished from all others of a similar class, together with such parts as I claim and desire to have secured to me by Letters Patent.

In originating the present invention, the principal object has been to combine the flexibility of hose or tubes composed of woven or braided fibrous materials with the imperviousness to water or moisture of rubber or gutta-percha.

It has been demonstrated in practice that, while there are great advantages attending the use of hose, for conveying liquids under pressure, made from fibrous materials, there is a great disadvantage proceeding from the fact that the strands or threads absorb and retain for a long time the water or moisture with which they may come in contact, the effect being to mildew and rot this kind of hose in a short time.

To obviate this latter imperfection is the object of my improvement, which consists in first saturating or incorporating, with threads or strands of fibrous materials, rubber or gutta-percha, or the compounds of either or both, and then weaving or braiding the same with a tube or hose of the required bore. By this means, while retaining all the flexibility and lightness of hose composed of woven fibrous materials, I also obtain all the imperviousness to moisture and consequent durability of india-rubber or gutta-percha, the tendency of the tube thus formed to mildew and rot being entirely prevented.

The figures of the accompanying plate of drawings represent my improved hose or tubing.

Figure 1:
Figure 2:
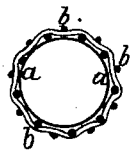

Figure 1 is a plan or top view. Fig. 2 is a transverse section.

The precise form of hose may, it is obvious, be considerably modified, as the woven tube may, for example, have an inner lining of rubber or gutta-percha, and an outer tube of the same materials may (but I do not think it best) be slipped over the water proof woven tube.

The mode that I prefer to make my improved hose is to first take threads or strands of the desired size, and then saturate or cause to be incorporated with them rubber or gutta-percha (reduced to a proper consistency) by passing them through friction-rollers with the rubber or gutta-percha, in the manner well-known to rubber manufacturers. The threads or strands thus prepared may then be dried or cured by artificial heat or by the vulcanizing process, and are then woven into a web or tube on a loom. If woven in the form of a flat web, the latter may be united at its two edges by riveting or otherwise, but I prefer to weave or braid them into a circular tube without a seam.

It will be evident that the threads or strands, after being rendered water-proof, as above described, may be woven or braided either by hand or by machinery, and either before or after they are cured.

Having thus described my improvements, what I claim as my invention, and desire to have secured to me by Letters Patent, is—

Forming a hose or tubing by first saturating or incorporating, with threads or strands of fibrous materials, rubber or gutta-percha, or compounds of either or both, and then weaving or braiding the same, substantially as set forth.

THOS. J. MAYALL.

Witnesses:
JOSEPH GAVETT,
ALBERT W. BROWN.